June 24, 1930.   D. R. FRANCIS   1,767,787
VARIABLE SPEED GEAR TRANSMISSION
Filed Oct. 9, 1926   2 Sheets-Sheet 1
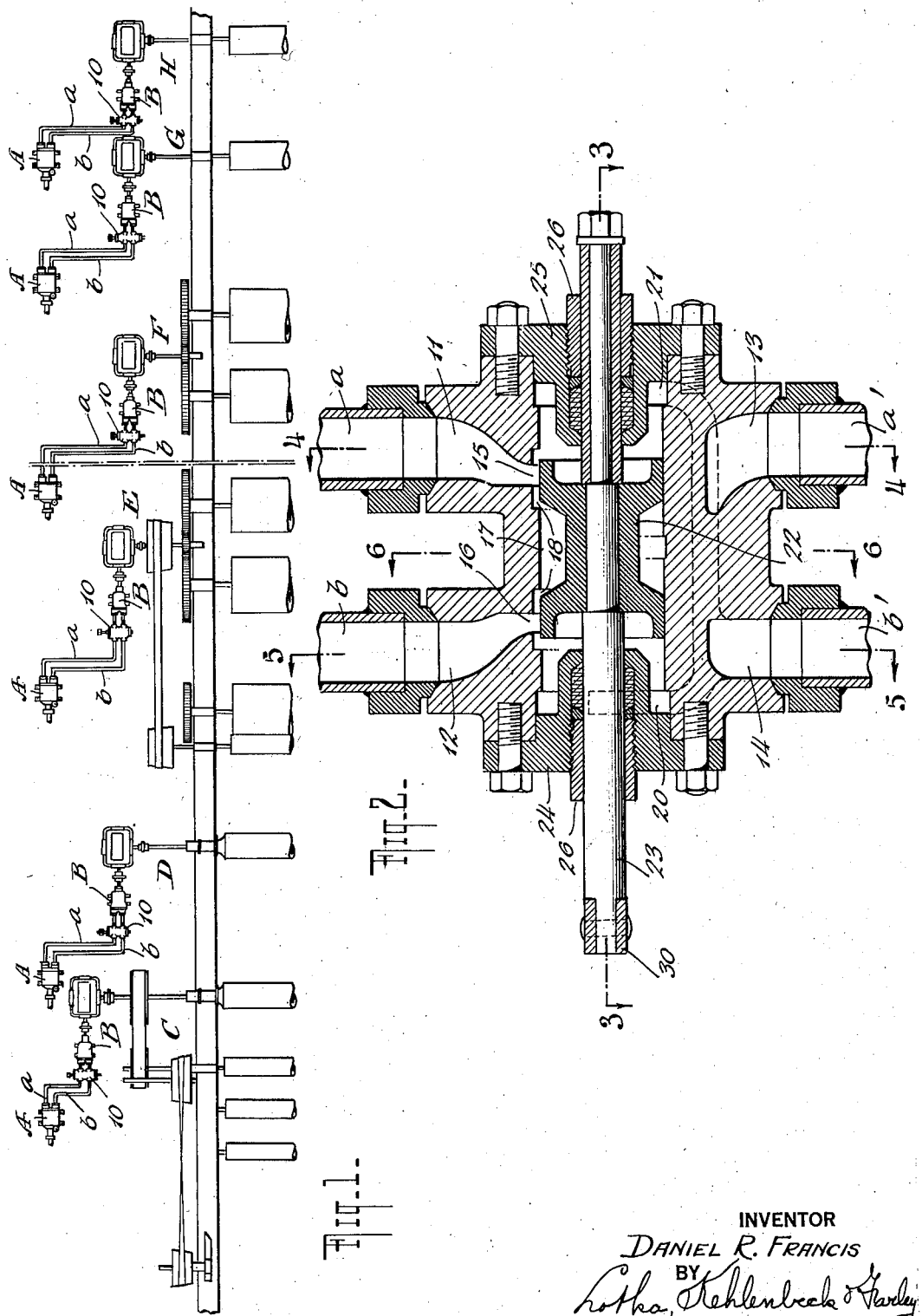
INVENTOR
DANIEL R. FRANCIS
BY
ATTORNEYS

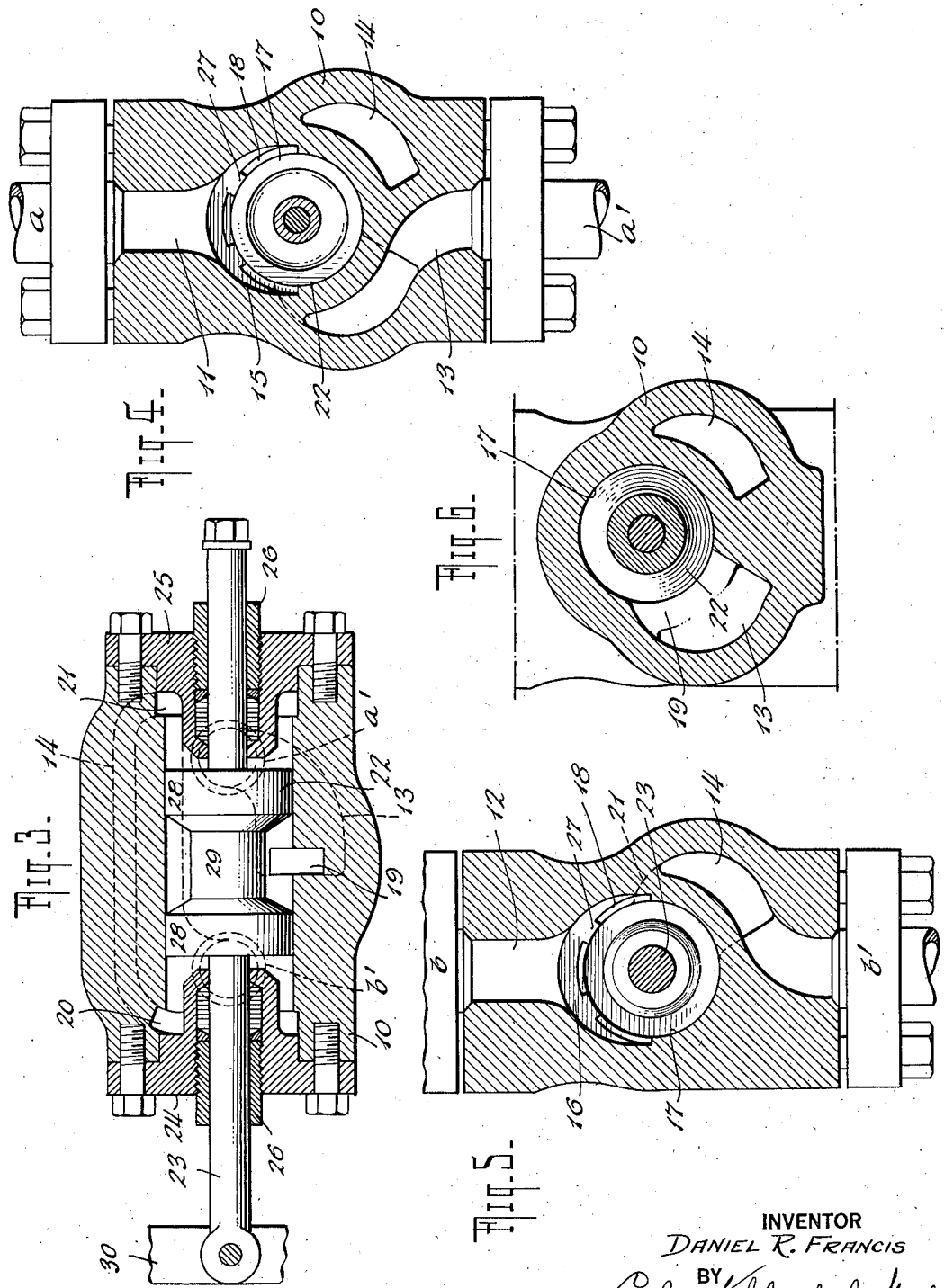

Patented June 24, 1930

1,767,787

UNITED STATES PATENT OFFICE

DANIEL R. FRANCIS, OF WATERBURY, CONNECTICUT, ASSIGNOR TO THE WATERBURY TOOL COMPANY, OF WATERBURY, CONNECTICUT, A CORPORATION OF CONNECTICUT

VARIABLE-SPEED-GEAR TRANSMISSION

Application filed October 9, 1926. Serial No. 140,433.

This invention relates to hydraulic speed gears of the type disclosed in Letters Patent of the United States granted to Harvey D. Williams on June 15, 1909, No. 925,148 and on November 19, 1912, No. 1,044,838.

Hydraulic speed gears of this type consist of a fluid pressure pump, driven by any suitable means, such as an electric motor, and one or more fluid pressure motors, to which fluid under pressure from the pump is delivered for producing a rotation of the motor shafts in accordance with the amount of fluid delivered to and passed through said motors by the action of the pump. Speed gears of this particular type have found considerable application in the industries, especially where extreme accuracy and flexibility of speed control are desired and where abrupt or sudden speed changes must be avoided. Such gears are especially adapted for use in driving machinery, for example, paper machinery, which consists of a plurality of sections driven at equal or nearly equal speeds. In such installations, the main driving means for the machine, which consists of an electric motor and the pump of the speed gear, may be located at any convenient point and pipe line connections extend from said pump to the hydraulic motor for each of the various sections of the machine. Paper making machines, which complete the finished paper from the pulp, are very long machines and consequently some of the hydraulic motors for the various sections of the machines may be located quite a considerable distance away from the main driving device and the control therefor. The same is also true with textile machinery where the material to be treated passes continuously through a number of machines arranged in tandem to perform successive operations upon the fabric. If an accident should occur at one of the sections of such a long machine, such as a workman being caught in the machinery, or breakage of some part of the machine occurring, loss of life might occur, or serious damage be done to the machinery before the main power control, located some distance away, could be shut off.

The object of the present invention is to provide, in combination with a hydraulic speed gear installation of the type referred to, means for enabling any one of the hydraulic motors to be immediately stopped, or reversed, and a corresponding control of the section of the machine secured by the simple manipulation of a single controlling device located immediately adjacent to each hydraulic motor and the section of the machine which it drives.

Another object of the present invention is to provide a new and improved construction of a 4-way reversing valve of general application, for reversing the flow of fluid in a pair of conduits and also for by-passing the fluid from one conduit to another.

The above and other objects of the present invention will be apparent to those skilled in the art to which the invention appertains from the following more detailed description and by reference to the accompanying drawings forming a part hereof.

In the drawings, Fig. 1 is a diagrammatic plan view of a hydraulic speed gear installation to a paper making machine, showing by way of example, an application of the principles of the present invention to such a machine; Fig. 2 is an enlarged plan of a valve constructed in accordance with the principles of this invention; Fig. 3 is a longitudinal section on the line 3—3 of Fig. 2 of the valve and Figs. 4, 5 and 6 are cross sections on the lines 4—4, 5—5, and 6—6 of Fig. 2.

As shown in the drawings the reference character A indicates a pump, or A-end as it is usually designated, of a hydraulic speed gear of the type disclosed in the patents to Williams above referred to. The drive shaft of this pump may be driven from a line shaft or may be directly connected to the armature shaft of an electric motor. The suction and pressure ports of the pumps are connected by suitable piping, $a$, $b$, with the suction and pressure ports of the fluid pressure motors or B-ends of the hydraulic gear, the motors being designated by the reference character B in the drawings.

As the constructional details of the pump and motors form no part of the present invention such details have not been fully shown and need be but briefly described. As disclosed more fully in the patents above referred to, each pump and motor is provided with a rotating barrel having a number of cylinders therein, in which reciprocate pistons, said pistons being connected with a swash plate, which in the pump, is usually adjustable to vary the stroke of the pistons and therefore the amount of fluid delivered by the pump, and which, in the motors, is usually held at a fixed inclination. The fluid delivered by the pump to the motors, causes the pistons of each respective motor to be reciprocated and produce a rotation of its swash plate to which is connected the driving shaft of each respective motor.

The paper making machine is diagrammatically shown in the drawing as consisting of a plurality of sections C, D, E, F, G and H, each of which is provided with a hydraulic motor B. Each respective motor is provided with a 4-way reversing valve 10, connected across the pipe lines $a$, $b$, and which as presently to be described, is so constructed that when the valve is set in one of its positions, the fluid will pass from the pipe $b$ directly to the motor B and will return by the pipe $a$ to the pump A; and which in another of its positions will reverse the flow of the fluid through the motor so that the ports of the motor which formerly were the suction and pressure ports will become pressure and suction ports. In another position of the valve the fluid will be caused to pass directly across from the pipe $b$ to the pipe $a$ without passing through the motor.

The construction of the reversing valve is shown in Figs. 2 to 6 of the drawings, inclusive. Said valve comprises an outer casing having four flanged conduits 11, 12, 13 and 14, the conduits 11 and 12 being located at one side of the valve casing, the conduits 13 and 14 upon the other side thereof, and the conduits 11 and 12 being in axial alignment with the conduits 13 and 14, respectively, so that the valve casing may be readily connected in the pipe lines $a$ and $b$, in a manner which will be readily understood. As shown in Fig. 2 the ends of the pipes $a$, $b$, which lead to the pump, are connected to the conduits 11 and 12 respectively, while the ends of the pipes $a'$, $b'$, which extend from the valve casing to the fluid pressure motor B, are connected to the conduits 13 and 14. The conduits 11 and 12 are of similar construction and terminate at their inner ends in elongated ports 15 and 16, through which the conduits communicate with a cylindrical valve chamber 17. These ports extend approximately half way around the circumference of the valve chamber, and a plurality of recesses or depressions 18 are provided in the wall of the valve chamber adjacent to and in communication with the ports 15, 16 for a purpose presently to be described. The conduit 13 terminates in a port 19 located substantially midway of the valve chamber 17 and in communication with said chamber, while the conduit 14 branches and terminates in two ports 20 and 21, located one at each end of, and in communication with, said valve chamber.

Slidably mounted within the valve chamber 17 is a piston valve 22, suitably secured to a valve operating rod 23, said rod extending at each end outwardly beyond the valve casing and being slidably mounted in packing boxes 24, 25 detachably secured to the valve casing; each of said packing boxes being provided with stuffing glands 26 to prevent leakage of the fluid about the valve rod in accordance with the usual construction of devices of this character. It will be noted that a plurality of webs 27 are provided between the recesses 18 for furnishing bearing surfaces for the piston valve.

The piston valve is of the same general configuration as used for locomotive slide valves and has a pair of annular bearing surfaces 28 at each of its ends, between which surfaces the valve body is reduced, as indicated by the reference character 29.

The operation is as follows: Assuming that the pipes $a$ and $b$ are the suction and pressure pipes respectively, it will be seen that when the valve 22 is moved to its extreme position to the right of Fig. 2 of the drawing, the bearing surfaces of the valve will be located to the right of the ports 15 and 16 respectively. In this position of the valve, the pipe $a$ will be in communication with the pipe $a'$ and the pipe $b$ in communication with the pipe $b'$, the fluid passing to the motor through pipe $b$, conduit 12, port 16, through the valve chamber 17 to the left of the valve, entering port 20 and passing through conduit 14 to the pipe $b'$; while the fluid passing from the motor will flow through the pipe $a'$, conduit 13, port 19, around the reduced central portion 29 of the valve, and thence through port 15, and conduit 11 to the pipe $a$. When the valve is moved to the extreme left of Fig. 2 of the drawing, the fluid will then flow from the pipe $b$ through conduit 12, port 16, through the valve chamber 17, around the reduced portion 29 of the valve, and, entering port 19, will flow through the conduit 13 to the pipe $a'$; while the fluid from the motor will leave through the pipe $b'$, conduit 14, port 21, and will flow from port 21 through the valve chamber 17, past the right end of the valve 22 to port 15 and conduit 11 thence through to the suction pipe $a$. When the valve is in the midway position shown in the drawings, the fluid will be by-passed from the pipe b to the pipe a, the fluid passing from the pipe b through conduit 12 and port 16 to the recesses 18 of said port from which it flows through the valve chamber around the reduced portion 29 of the valve to the recesses 18 of the port 15 and thence through the port 15 and conduit 11 to the pipe a.

Any suitable means may be provided for operating the valve 22; as shown in the drawings, one end of the valve rod 23 is reduced to provide a straight sided tongue with which is engaged the yoked jaws of a lever 30. The lever 30 may be actuated in any suitable manner as for example by having one end thereof pivotally secured to any suitable support and the other end provided with a handle by means of which the lever may be swung upon its pivot to slide the valve to its different operative positions.

It will be seen that by a simple manipulation of the valve rod 23 directly or by means of any suitable device such as the lever 30, the valve may be quickly moved to any of its three positions so as to start, stop or reverse any section of the machine or installation.

It will be understood that many changes, variations and modifications may be resorted to without departing from the principles of my invention.

I claim:

In combination with a paper making machine having a plurality of units each of which is composed of a plurality of rolls, a hydraulic variable speed gear comprising a variable pump, a delivery motor for each of said units, and suction and pressure pipe lines connecting each of said motors in parallel with said pump, said pump having an adjustable control shaft for varying the speed of said gear between zero and a maximum, means for instantly stopping or reversing the drive of each unit without changing the adjustment of the control shaft of said pump or the adjustment of the remainder of said motor driven units, whereby the rolls of each unit may be driven at a correlated speed ratio, said means comprising a valve casing connected across said pressure and suction pipe lines to each motor, said valve casing being provided with two pairs of conduits, a valve mounted in said casing, said valve being movable to a plurality of set positions, in one of which the conduits of each pair of conduits are in direct communication with each other and with said motor to cause the fluid to flow through said motor in one direction, in a second position one conduit of each pair of conduits is in communication with a conduit of the other pair to reverse the flow of fluid through said valve and motor, thereby to reverse said motor, and in a third position one conduit of each pair of conduits is in communication with a different conduit of the other pair than in said second position, to cause the fluid to be by-passed through said valve, and thereby render said motor inoperative, whereby one unit of said paper machine may have its speed altered without disturbing the related speed ratio between the remainder of said units.

In testimony whereof I have hereunto set my hand.

DANIEL R. FRANCIS.